(12) United States Patent
Yang et al.

(10) Patent No.: US 11,205,124 B1
(45) Date of Patent: Dec. 21, 2021

(54) METHOD AND SYSTEM FOR CONTROLLING HEAVY-HAUL TRAIN BASED ON REINFORCEMENT LEARNING

(71) Applicant: East China Jiaotong University, Nanchang (CN)

(72) Inventors: Hui Yang, Nanchang (CN); Yu Wang, Nanchang (CN); Zhongqi Li, Nanchang (CN); Yating Fu, Nanchang (CN); Chang Tan, Nanchang (CN)

(73) Assignee: East China Jiaotong University, Nanchang (CN)

( * ) Notice: Subject to any disclaimer, the term of this patent is extended or adjusted under 35 U.S.C. 154(b) by 0 days.

(21) Appl. No.: 17/186,795

(22) Filed: Feb. 26, 2021

(30) Foreign Application Priority Data

Dec. 4, 2020 (CN) .......................... 202011396657.6

(51) Int. Cl.
| | | |
|---|---|---|
| *B61D 3/08* | (2006.01) | |
| *G06N 3/08* | (2006.01) | |
| *B61L 25/02* | (2006.01) | |
| *G06K 9/62* | (2006.01) | |
| *G05B 13/04* | (2006.01) | |
| *G06N 5/02* | (2006.01) | |

(52) U.S. Cl.
CPC .............. *G06N 3/08* (2013.01); *B61L 25/021* (2013.01); *B61L 25/023* (2013.01);
(Continued)

(58) Field of Classification Search
CPC ........ G06N 3/08; G06N 5/022; G05B 13/042; G06K 9/6259; B61L 25/021;
(Continued)

(56) References Cited

U.S. PATENT DOCUMENTS 9,937,936 B2 * 4/2018 Brooks ............... B61L 15/0081
10,572,850 B2 * 2/2020 Johnson ............... G06Q 10/083
(Continued)

FOREIGN PATENT DOCUMENTS

CN 10684295 A 6/2017

OTHER PUBLICATIONS

Albeaik et al., Deep Truck : A deep neural network model for longitudinal dynamics of heavy duty trucks, 2019, IEEE, p. 4158-4163 (Year: 2019).*
(Continued)

*Primary Examiner* — McDieunel Marc
(74) *Attorney, Agent, or Firm* — Cooper Legal Group, LLC

(57) ABSTRACT

The present disclosure provides a method and system for controlling a heavy-haul train based on reinforcement learning. The method includes: obtaining operation state information of a heavy-haul train at a current time point; obtaining a heavy-haul train action of a next time point according to the operation state information of the heavy-haul train at the current time point and a heavy-haul train virtual controller, and sending the heavy-haul train action of the next time point to a heavy-haul train control unit to control operation of the heavy-haul train. The heavy-haul train virtual controller is obtained by training a reinforcement learning network according to operation state data of the heavy-haul train and an expert strategy network; the reinforcement learning network includes one actor network and two critic networks; the reinforcement learning network is constructed according to a soft actor-critic (SAC) reinforcement learning algorithm.

8 Claims, 7 Drawing Sheets

(52) U.S. Cl.
CPC .......... *B61L 25/028* (2013.01); *G05B 13/042* (2013.01); *G06K 9/6256* (2013.01); *G06N 5/022* (2013.01)

(58) Field of Classification Search
CPC ..... B61L 25/023; B61L 25/028; B61D 3/166; B61D 45/003; B61D 3/08; B61D 11/02; B61D 17/08; F03D 13/40; B60P 3/40; E04H 12/00; B65G 67/12; B28B 17/0081
See application file for complete search history.

(56) References Cited

U.S. PATENT DOCUMENTS

| | | | |
|---|---|---|---|
| 2017/0057526 A1* | 3/2017 | Cooper | B61L 15/0027 |
| 2017/0152833 A1* | 6/2017 | Keller | F03D 80/00 |
| 2017/0253169 A1* | 9/2017 | Keller | B61D 45/003 |
| 2019/0378042 A1* | 12/2019 | Tuzi | G06N 7/005 |
| 2021/0073995 A1* | 3/2021 | Yang | G06N 3/0445 |
| 2021/0089966 A1* | 3/2021 | Schmidhuber | G06N 20/00 |

OTHER PUBLICATIONS

Wang et al., Improved Reinforcement Learning through Imitation Learning Pretraining Towards Image-based Autonomous Driving, 2019, IEEE, p. 1306-1310 (Year: 2019).*

Dadhich et al., Adaptation of a wheel loader automatic bucket filling neural network using reinforcement learning, 2020, IEEE, p. 1-9 (Year: 2020).*

Shiteole et al., Optimizing Earth Moving Operations Via Reinforcement Learning, 2019, IEEE, p. 2954-2965 (Year: 2019).*

* cited by examiner

METHOD AND SYSTEM FOR CONTROLLING HEAVY-HAUL TRAIN BASED ON REINFORCEMENT LEARNING

RELATED APPLICATION

This application claims the benefit of priority from Chinese Patent Application No. 202011396657.6, filed on Dec. 4, 2020. The content of the aforementioned application, including any intervening amendments thereto, is incorporated herein by reference in its entirety.

TECHNICAL FIELD

The present disclosure relates to the technical field of intelligent control of heavy-haul trains, and in particular, to a method and system for controlling a heavy-haul train based on reinforcement learning.

BACKGROUND

At present, heavy-haul railway lines are continuously expanding in China, and heavy-haul railway transportation is important strategically and economically in rail transportation. Currently, the operation of a heavy-haul train relies on the experience and skills of a driver, while heavy-haul lines have characteristics of long distances and complex line conditions. In addition, a heavy-haul train carries heavy weights and combines many vehicles, and this greatly challenges the control level and mental state of the driver. A better control strategy is needed to control a running process of the heavy-haul train, so that the heavy-haul train runs safely and on time. Therefore, modeling and control of the heavy-haul train have become the focus and trend of current research.

For the operation control of the heavy-haul train, a target curve is generally designed by using a classic control method, and in addition, a tracking controller is also designed, to realize automatic driving. The tracking controller generally adopts a classic proportional-integral-derivative (PID) control algorithm. However, in the PID control algorithm, parameter selection relies on manual adjustment, which is not suitable for the complex process control of the heavy-haul train. In this regard, some people have proposed to implement speed tracking control of the heavy-haul train by using a generalized predictive control algorithm. However, the generalized predictive control algorithm involves complex computing, and does not perform well in a heavy-haul train control system that responds in real time. Some people have combined automatic parking control of the heavy-haul train with fuzzy control. However, a fuzzy rule and a membership function in fuzzy control are derived from experience, and are difficult to control and calculate during the operation of the heavy-haul train.

With the development of artificial neural networks, some people have proposed a data-driven method for controlling a heavy-haul train. However, ordinary neural network training requires a large amount of actual data, and the uneven distribution of actual data samples results in overfitting of a trained controller. There are more changes in actual scenes, and the state of the trained controller is prone to collapse in an unknown sample space, which is extremely risky in actual applications.

SUMMARY

The present disclosure aims to provide a method and system for controlling a heavy-haul train based on reinforcement learning, to achieve safety, stability, and high efficiency.

To achieve the above objective, the present disclosure provides the following solutions:

A method for controlling a heavy-haul train based on reinforcement learning, including:

obtaining operation state information of a heavy-haul train at a current time point, where the heavy-haul train includes a plurality of vehicles, the vehicles include a traction locomotive and freight wagons, and the operation state information includes a speed of the heavy-haul train and a position of the heavy-haul train; and obtaining a heavy-haul train action of a next time point according to the operation state information of the heavy-haul train at the current time point and a heavy-haul train virtual controller, and sending the heavy-haul train action of the next time point to a heavy-haul train control unit to control operation of the heavy-haul train;

where the heavy-haul train virtual controller stores line information of the heavy-haul train; and the heavy-haul train virtual controller is obtained by training a reinforcement learning network according to operation state data of the heavy-haul train and an expert strategy network; the reinforcement learning network includes one actor network and two critic networks; the reinforcement learning network is constructed according to a soft actor-critic (SAC) reinforcement learning algorithm; the operation state data of the heavy-haul train is a temporal sequence of positions, speeds, and rewards of the heavy-haul train in M cycles.

Optionally, a training process of the expert strategy network includes:

pre-training a recurrent neural network by using historical data of actual operation of the heavy-haul train, to obtain the expert strategy network, where the historical data of actual operation of the heavy-haul train is a temporal sequence of positions, speeds, and control forces of the heavy-haul train on a line in N cycles.

Optionally, a training process of the heavy-haul train virtual controller includes:

constructing a training architecture of the heavy-haul train virtual controller, where the training architecture of the heavy-haul train virtual controller includes the expert strategy network, the reinforcement learning network, a memory, and a simulation environment for heavy-haul train operation, and the memory stores the operation state data of the heavy-haul train; inputting same-cycle positions in the operation state data of the heavy-haul train to the expert strategy network and the actor network of the reinforcement learning network, and inputting same-cycle speeds in the operation state data of the heavy-haul train to the expert strategy network and the actor network of the reinforcement learning network, to obtain an expert action and a reinforcement learning action;

inputting the reinforcement learning action as well as the same-cycle speeds and the same-cycle positions in the operation state data of the heavy-haul train to the critic networks of the reinforcement learning network, to obtain a critic loss;

calculating an instruction loss according to the expert action and the reinforcement learning action, and updating actor network parameters of the reinforcement learning network according to a comprehensive loss, until a required heavy-haul train virtual controller is obtained, where the comprehensive loss is a sum of the critic loss and the instruction loss.

Optionally, the training process of the heavy-haul train virtual controller further includes:

updating critic network parameters of the reinforcement learning network according to a reward of the operation state data of the heavy-haul train.

Optionally, the training process of the heavy-haul train virtual controller further includes:

inputting the reinforcement learning action to the simulation environment for heavy-haul train operation, to obtain updated operation state data of the heavy-haul train, and storing the updated operation state data of the heavy-haul train into the memory.

Optionally, a process of constructing the simulation environment for heavy-haul train operation includes:

determining a kinematic model of the heavy-haul train;

determining, in a reinforcement learning environment, a reward function of an operation process of the heavy-haul train, where the reward function includes a speed reward function, an explore range reward function, and a maximum coupler force reward function; and forming the simulation environment for heavy-haul train operation according to the kinematic model of the heavy-haul train and the reward function.

Optionally, the determining a kinematic model of the heavy-haul train includes:

modeling the operation process of the heavy-haul train by using a multi-particle longitudinal dynamic equation of the heavy-haul train, to obtain the kinematic model of the heavy-haul train.

A system for controlling a heavy-haul train based on reinforcement learning, including:

an information obtaining module, configured to obtain operation state information of a heavy-haul train at a current time point, where the heavy-haul train includes a plurality of vehicles, the vehicles include a traction locomotive and freight wagons, and the operation state information includes a speed of the heavy-haul train and a position of the heavy-haul train; and an action determining module, configured to obtain a heavy-haul train action of a next time point according to the operation state information of the heavy-haul train at the current time point and a heavy-haul train virtual controller, and send the heavy-haul train action of the next time point to a heavy-haul train control unit to control operation of the heavy-haul train;

where the heavy-haul train virtual controller stores line information of the heavy-haul train; and the heavy-haul train virtual controller is obtained by training a reinforcement learning network according to operation state data of the heavy-haul train and an expert strategy network; the reinforcement learning network includes one actor network and two critic networks; the reinforcement learning network is constructed according to a soft actor-critic (SAC) reinforcement learning algorithm; the operation state data of the heavy-haul train is a temporal sequence of positions, speeds, and rewards of the heavy-haul train in M cycles.

Optionally, a training process of the expert strategy network in the action determining module includes:

pre-training a recurrent neural network by using historical data of actual operation of the heavy-haul train, to obtain the expert strategy network, where the historical data of actual operation of the heavy-haul train is a temporal sequence of positions, speeds, and control forces of the heavy-haul train on a line in N cycles.

Optionally, a training process of the heavy-haul train virtual controller in the action determining module includes:

constructing a training architecture of the heavy-haul train virtual controller, where the training architecture of the heavy-haul train virtual controller includes the expert strategy network, the reinforcement learning network, a memory, and a simulation environment for heavy-haul train operation, and the memory stores the operation state data of the heavy-haul train;

inputting same-cycle positions in the operation state data of the heavy-haul train to the expert strategy network and the actor network of the reinforcement learning network, and inputting same-cycle speeds in the operation state data of the heavy-haul train to the expert strategy network and the actor network of the reinforcement learning network, to obtain an expert action and a reinforcement learning action;

inputting the reinforcement learning action as well as the same-cycle speeds and the same-cycle positions in the operation state data of the heavy-haul train to the critic networks of the reinforcement learning network, to obtain a critic loss;

calculating an instruction loss according to the expert action and the reinforcement learning action; and updating actor network parameters of the reinforcement learning network according to a comprehensive loss, until a required heavy-haul train virtual controller is obtained, where the comprehensive loss is a sum of the critic loss and the instruction loss.

According to specific embodiments of the present disclosure, the present disclosure has the following technical effects.

The present disclosure addresses the control problem of a nonlinear system of a heavy-haul train in a complex environment, and provides a method and system for controlling a heavy-haul train based on reinforcement learning. An operation state space of the heavy-haul train is explored by using a reinforcement learning algorithm, and fitting and prediction are performed on expert strategy data by using a recurrent neural network, to obtain a safe, stable and efficient heavy-haul train virtual controller through training. Moreover, the heavy-haul train virtual controller is applied to the actual operation of the heavy-haul train, to achieve safety, stability, and high efficiency.

BRIEF DESCRIPTION OF THE DRAWINGS

To describe the technical solutions in embodiments of the present disclosure or in the prior art more clearly, the accompanying drawings needed in the embodiments will be introduced below briefly. Apparently, the accompanying drawings in the following description show merely some embodiments of the present disclosure, and other drawings can be derived from these accompanying drawings by those of ordinary skill in the art without creative efforts.

DETAILED DESCRIPTION

The technical solutions of the embodiments of the present disclosure are clearly and completely described below with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method and system for controlling a heavy-haul train based on reinforcement learning, to achieve safety, stability, and high efficiency.

To make the objectives, features, and advantages of the present disclosure more obvious and comprehensive, the following further describes in detail the present disclosure with reference to the accompanying drawing and specific implementations.

A reinforcement learning algorithm includes two parts: an actor network and a critic network; train and line states are inputted to the actor network, and the actor network outputs an action; train and line states and an action are inputted to the critic network, and the critic network outputs a value.

EMBODIMENT 1

Figure 1:
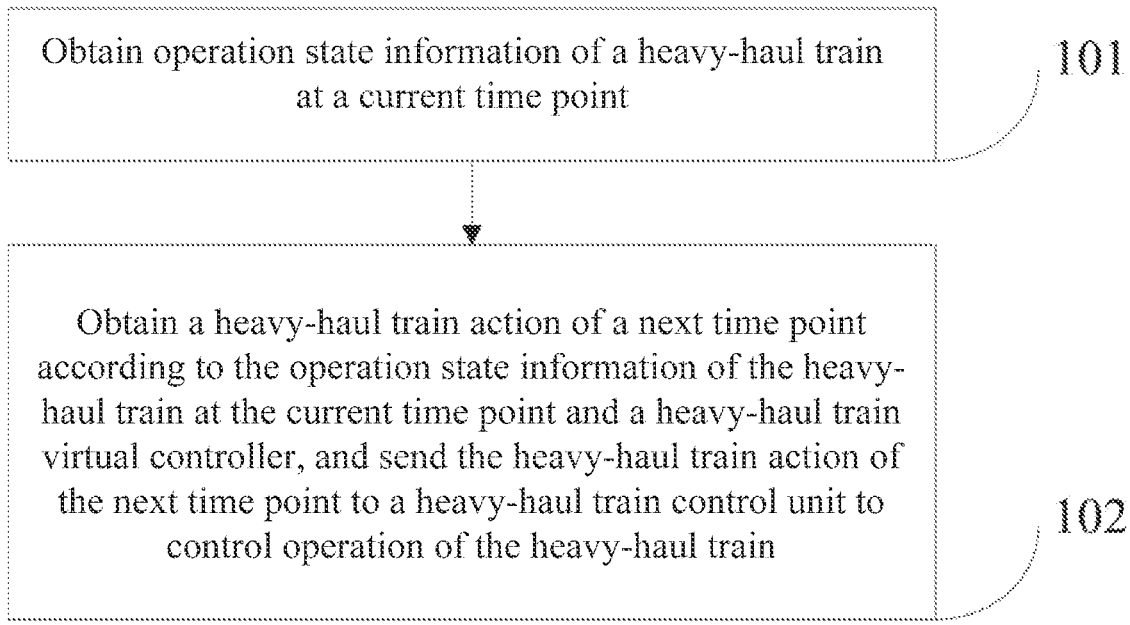
FIG. 1 is a flowchart of a method for controlling a heavy-haul train based on reinforcement learning according to Embodiment 1 of the present disclosure.

As shown in FIG. 1, a method for controlling a heavy-haul train based on reinforcement learning provided in this embodiment includes the following steps:

Step 101: obtaining operation state information of a heavy-haul train at a current time point, where the heavy-haul train includes a plurality of vehicles, the vehicles include a traction locomotive and freight wagons, and the operation state information includes a speed of the heavy-haul train and a position of the heavy-haul train.

Step 102: obtaining a heavy-haul train action of a next time point according to the operation state information of the heavy-haul train at the current time point and a heavy-haul train virtual controller, and sending the heavy-haul train action of the next time point to a heavy-haul train control unit to control operation of the heavy-haul train.

The heavy-haul train virtual controller stores line information of the heavy-haul train.

The heavy-haul train virtual controller is obtained by training a reinforcement learning network according to operation state data of the heavy-haul train and an expert strategy network; the reinforcement learning network includes one actor network and two critic networks; the reinforcement learning network is constructed according to a soft actor-critic (SAC) reinforcement learning algorithm; the operation state data of the heavy-haul train is a temporal sequence of positions, speeds, and rewards of the heavy-haul train in M cycles.

A training process of the expert strategy network is as follows: pre-training a recurrent neural network by using historical data of actual operation of the heavy-haul train, to obtain the expert strategy network, where the historical data of actual operation of the heavy-haul train is a temporal sequence of positions, speeds, and control forces of the heavy-haul train on a line in N cycles.

A training process of the heavy-haul train virtual controller is as follows:

Step 11: constructing a training architecture of the heavy-haul train virtual controller, where the training architecture of the heavy-haul train virtual controller includes the expert strategy network, the reinforcement learning network, a memory, and a simulation environment for heavy-haul train operation; the memory stores the operation state data of the heavy-haul train, the simulation environment for heavy-haul train operation is used for updating the operation state data of the heavy-haul train according to a current action, and storing updated operation state data of the heavy-haul train into the memory.

Step 12: inputting same-cycle positions in the operation state data of the heavy-haul train to the expert strategy network and the actor network of the reinforcement learning network, and inputting same-cycle speeds in the operation state data of the heavy-haul train to the expert strategy network and the actor network of the reinforcement learning network, to obtain an expert action and a reinforcement learning action.

Step 13: inputting the reinforcement learning action as well as the same-cycle speeds and positions in the operation state data of the heavy-haul train to the critic networks of the reinforcement learning network, to obtain a critic loss.

Step 14: calculating an instruction loss according to the expert action and the reinforcement learning action.

Step 15: updating actor network parameters of the reinforcement learning network according to a comprehensive loss, until a required heavy-haul train virtual controller is obtained, where the comprehensive loss is a sum of the critic loss and the instruction loss.

The training process of the heavy-haul train virtual controller further includes the following steps:

Step 16: inputting the reinforcement learning action to the simulation environment for heavy-haul train operation, to obtain updated operation stale data of the heavy-haul train, and storing the updated operation state data of the heavy-haul train into the memory.

Step 17: updating critic network parameters of the reinforcement learning network according to a reward of the operation state data of the heavy-haul train.

A process of constructing the simulation environment for heavy-haul train operation is as follows:

Step 1101: determining a kinematic model of the heavy-haul train, which specifically includes modeling an operation process of the heavy-haul train by using a multi-particle longitudinal dynamic equation of the train, to obtain the kinematic model of the heavy-haul train.

Step 1102: determining, in a reinforcement learning environment, a reward function of an operation process of the heavy-haul train, where the reward function includes a speed reward function, an explore range reward function, and a maximum coupler force reward function.

Step 1103: forming the simulation environment for heavy-haul train operation according to the kinematic model of the heavy-haul train and the reward function.

EMBODIMENT 2

Figure 2:
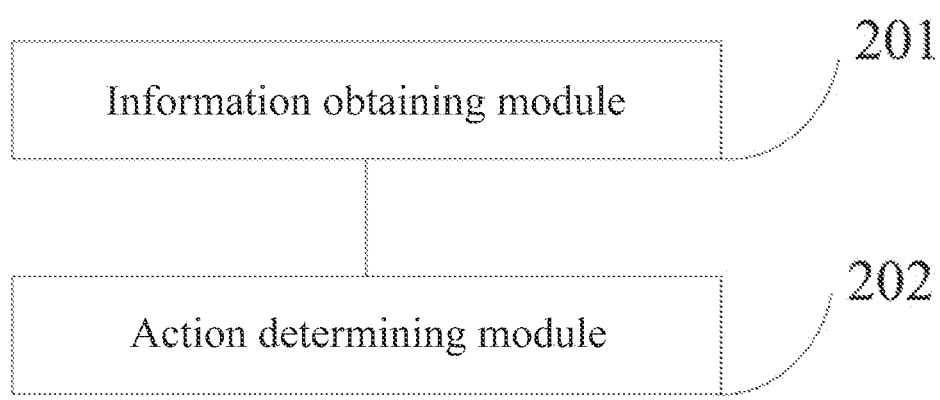
FIG. 2 is a structural diagram of a system for controlling a heavy-haul train based on reinforcement learning according to Embodiment 2 of the present disclosure.

As shown in FIG. 2, this embodiment provides a system for controlling a heavy-haul train based on reinforcement learning, including:

an information obtaining module 201, configured to obtain operation state information of a heavy-haul train at a current time point, where the heavy-haul train includes a plurality of vehicles, the vehicles include a traction locomotive and freight wagons, and the operation state information includes a speed of the heavy-haul train and a position of the heavy-haul train; and an action determining module 202, configured to obtain a heavy-haul train action of a next time point according to the operation state information of the heavy-haul train at the current time point and a heavy-haul train virtual controller, and send the heavy-haul train action of the next time point to a heavy-haul train control unit to control operation of the heavy-haul train.

The heavy-haul train virtual controller stores line information of the heavy-haul train.

The heavy-haul train virtual controller is obtained by training a reinforcement learning network according to operation state data of the heavy-haul train and an expert strategy network; the reinforcement learning network includes one actor network and two critic networks; the reinforcement learning network is constructed according to a SAC reinforcement learning algorithm; the operation state data of the heavy-haul train is a temporal sequence of positions, speeds, and rewards of the heavy-haul train in M cycles.

A training process of the expert strategy network in the action determining module is as follow's:

pre-training a recurrent neural network by using historical data of actual operation of the heavy-haul train, to obtain the expert strategy network, where the historical data of actual operation of the heavy-haul train is a temporal sequence of positions, speeds, and control forces of the heavy-haul train on a line in N cycles.

A training process of the heavy-haul train virtual controller in the action determining module includes:

constructing a training architecture of the heavy-haul train virtual controller, where the training architecture of the heavy-haul train virtual controller includes the expert strategy network, the reinforcement learning network, a memory, and a simulation environment for heavy-haul train operation, and the memory stores the operation state data of the heavy-haul train;

inputting same-cycle positions in the operation state data of the heavy-haul train to the expert strategy network and the actor network of the reinforcement learning network, and inputting same-cycle speeds in the operation state data of the heavy-haul train to the expert strategy network and the actor network of the reinforcement learning network, to obtain an expert action and a reinforcement learning action;

inputting the reinforcement learning action as well as the same-cycle speeds and positions in the operation state data of the heavy-haul train to the critic networks of the reinforcement learning network, to obtain a critic loss;

calculating an instruction loss according to the expert action and the reinforcement learning action; and updating actor network parameters of the reinforcement learning network according to a comprehensive loss, until a required heavy-haul train virtual controller is obtained, where the comprehensive loss is a sum of the critic loss and the instruction loss.

EMBODIMENT 3

To achieve the foregoing objective, this embodiment provides a method for controlling a heavy-haul train based on reinforcement learning. The method includes the following steps:

Step I: constructing a heavy-haul train virtual controller.

A recurrent neural network is pre-trained by using historical data of actual operation of the heavy-haul train, to obtain an expert strategy network. An operation process of the heavy-haul train is modeled by using a multi-particle longitudinal dynamic equation of the train, to obtain a kinematic model of the heavy-haul train, and a reward function (used as a reward evaluation for a current action) of the operation process of the heavy-haul train is determined in a reinforcement learning environment. The kinematic model of the heavy-haul train and the reward function form a simulation environment for heavy-haul train operation. The simulation environment for heavy-haul train operation updates a speed and a position of the heavy-haul train based on an inputted action, and gives a reward obtained after the application of the action. Data obtained after each interaction with the simulation environment for heavy-haul train operation is stored in a memory. During training of a reinforcement learning network, M sets of data are sampled from the memory for learning. Same positions and same speeds of the heavy-haul train are inputted to the expert strategy network and an actor network of the reinforcement learning network, to obtain an expert action and a reinforcement learning action. A loss between an output of the actor network of the reinforcement learning network and an output of the expert strategy network is calculated, and a loss of an output of a critic network of the reinforcement learning network with respect to the actor network of the reinforcement learning network is calculated. A weighted sum of the two losses is calculated to obtain a comprehensive loss of the actor network of the reinforcement learning network, and parameters of the reinforcement learning network are updated according to the comprehensive loss, to finally obtain a heavy-haul train virtual controller meeting requirements.

In this embodiment, the training process is divided into three phases: startup, cruise, and braking, to accelerate simulation training.

Step II: obtaining operation state information of a heavy-haul train at a current time point, where the heavy-haul train includes a plurality of vehicles, the vehicles include a traction locomotive and freight wagons, and the operation state information includes a speed of the heavy-haul train and a position of the heavy-haul train.

Step III: obtaining a heavy-haul train action of a next time point according the operation state information of the heavy-haul train at the current time point and the heavy-haul train virtual controller, and sending the heavy-haul train action of the next time point to a heavy-haul train control unit to control operation of the heavy-haul train. The heavy-haul train virtual stores line information of the heavy-haul train.

A process of constructing the heavy-haul train virtual controller is described below.

Step 1: Operation State Space of the Heavy-Haul Train

Considering that a 10,000-ton heavy-haul train consists of a group of traction locomotives pulling multiple freight wagons, and each training cycle includes multiple state transitions, in order to reduce the calculation complexity, the operation state space of the heavy-haul train in this embodiment only contains speeds and positions of the leading vehicle, as shown in formula (1):

$$s_k = \{v_{k,1}, p_{k,1}\}, v_{k,1} \in [V_L^{lim}, V_H^{lim}], p_{k,1} \in [P_{st}, P_{nd}]; \quad (1)$$

$s_k$ represents an operation state of the heavy-haul train at a time point k; $v_{k,1}$ represents a speed of the head locomotive at the time point k; $p_{k,1}$ represents a position of the head locomotive at the time point k; $V_L^{lim}$, $V_H^{lim}$ represent a lower speed limit and an upper speed limit respectively; $P_{st}$, $P_{nd}$ represent a starting position and an ending position of the heavy-haul train respectively. The speed limit changes according to road sections and a running time. The starting position and the ending position of the heavy-haul train are adjusted according to the line information; k=1, 2, . . . , $N_{done}$, where $N_{done}$ is a time point when a termination condition is triggered.

Step 2: Expert Strategy Network

A recurrent neural network (RNN) is a neural network with time dynamic behaviors. In the control of the heavy-haul train, the use of states with a temporal dimension can improve the stability and safety of the heavy-haul train. In this embodiment, the expert strategy network is obtained through training by using the RNN in combination with the historical data of actual operation of the heavy-haul train (a temporal sequence of positions on a line, speeds and control forces of the heavy-haul train in N cycles). The expert strategy network is used as a constraint of a reinforcement learning network to make control of the heavy-haul train more stable.

The RNN is a multi-input multi-output network structure, and can make full use of historical data, to obtain optimal expert control experience through fitting, which achieves higher credibility when constraining the reinforcement learning network.

However, when used as the constraint of the reinforcement learning network, the expert strategy network is a multi-input single-output recurrent neural network. The input of the expert strategy network is the speed of the heavy-haul train and the position of the heavy-haul train, which are used to predict a control force of the heavy-haul train at the next time point.

Step 3: Equation for Updating the Speed of the Heavy-Haul Train and the Position of the Heavy-Haul Train The heavy-haul train has the characteristics of heavy load, long distribution, concentrated power at the front end, and gaps in the coupler connection. Therefore, in this embodiment, a multi-particle longitudinal dynamic model of the train is used as a kinematic model of the heavy-haul train, which facilitates the search of the heavy-haul train and reduces the longitudinal impulse during the operation of the heavy-haul train. The multi-particle longitudinal dynamic equation of the train is constructed based on dynamic characteristics, and then an equation for updating the speed of the heavy-haul train is obtained, as shown in formula (2).

$$m_i \ddot{x}_i = F_T + F_{i-1} + F_{i+1} - F_{pne} - F_e - F_w - F_R \quad (2)$$

In the formula, $m_i$ is the mass of the i-th car; $\ddot{x}_i$ is an acceleration of the i-th car; $F_T$ is a traction force of the traction locomotive; $F_e$ is an electric braking force of the traction locomotive; $F_{i-1}$ is a front coupler force; $F_{i+1}$ is a rear coupler force; $F_{pne}$ is an air braking force; $F_w$ is a basic resistance in vehicle operation; $F_R$ is an additional resistance of the heavy-haul train, and $F_R = F_{Rc} + F_{Ri}$, where $F_{Rc}$ is an additional resistance due to curve, and $F_{Ri}$ is an additional resistance due to gradient.

The operation state of the heavy-haul train is determined by the acceleration and speed of the train as well as the road conditions. After the multi-particle longitudinal dynamic equation of the train is established, and the nonlinear dynamic equation is solved by numerical integration to obtain the acceleration, speed, displacement, and/or other state variables of the train. The numerical integration process is as shown in formula (3):

$$\begin{cases} X_{n+1} = X_n + V_n \Delta t + \left(\frac{1}{2} + \psi\right) A_n \Delta t^2 - \psi A_{n-1} \Delta t^2 \\ V_{n+1} = V_n + (1+\varphi) A_n \Delta t - \varphi A_{n-1} \Delta t \end{cases} \quad (3)$$

In the formula, $X_{n+1}$ is a displacement value of the heavy-haul train at a next time point; $X_n$ is a displacement value of the heavy-haul train at a current time point; $V_{n+1}$ is a speed value of the heavy-haul train at the next time point; $V_n$ is a speed value of the heavy-haul train at the current time point; $A_n$ is an acceleration value of the heavy-haul train at the current time point; $A_{n-1}$ is an acceleration value of the heavy-haul train at a previous time point; $\Delta t$ is a time integration step. The subscripts n−1, n, and n+1 represent a time point of a previous step t=(n−1)Δt, a time point of a current step t=nΔt, and a time point of a next step t=(n+1)Δt. $\psi$ and $\varphi$ are independent parameters for controlling characteristics of the integration method, and are set to 0.5 here.

Step 4: Reward Design of Reinforcement Learning

Good rewards facilitate learning of the heavy-haul train. Sparse rewards prevent the heavy-haul train from obtaining any reward before reaching the goal, thus increasing the difficulty of training. An excessively large variance of the reward distribution results in an excessively large strategy gradient, causing learning to be unstable. The learning efficiency can be effectively improved by normalizing the rewards.

Although the essence of the reinforcement learning algorithm is to accumulate a reward value and maximize rewards, the setting of rewards needs to be strongly correlated with the goal to be achieved. Negative rewards help quickly end the round within a limited number of steps, and positive rewards encourage the heavy-haul train to continuously accumulate rewards to maintain a highest-reward state. In the process of learning to control the heavy-haul train, the heavy-haul train has two goals: from a startup phase to a cruise phase, positive rewards should be obtained to accumulate the reward value, and the heavy-haul train is encouraged to maximize rewards; in a braking process, the goal of the control is to safely stop at a designated point, and the reward should be designed to be a negative value in this case, so that the heavy-haul train can quickly reach the target state. In this embodiment, the speed reward function is as follows:

$$r_v = \begin{cases} (1-\bar{d}^\eta)(1-\bar{v})^{max(\bar{d},0.2)}, & \bar{d} < 2 \\ k_1 \bar{v}, & 0 < \bar{v} < 0.875 \\ k_2(1-\bar{v}), & \bar{v} > 0.875 \end{cases} \quad (4)$$

-continued $$v_{norm} = \frac{V_H^{lim}(p_{k+1,1}) - v_{k+1,1}}{V_H^{lim}(p_{k+1,1})};$$

d is a distance from a current position to a stop point, in the unit of km; $\overline{v}$ and $\overline{d}$ are a normalized speed and a normalized distance; $\&$ is an exponential parameter of the distance $\overline{d}$. By adjusting the value of $\&$, the slope of the reward change from the braking phase to the stop point can be changed; $k_1$ and $k_2$ are scaling factors related to the speed. Within 2 km from the destination, the speed reward follows a speed reward function under a parking braking condition, and the speed rewards under a startup traction condition and a cruise condition are the last two items in formula (4). The expression of the reward function under the braking condition includes parameters in two dimensions: speed and distance. A lower speed at a closer distance corresponds to a higher reward.

To accelerate the training of the algorithm, a target exploration space is constrained. To improve the training efficiency of the algorithm, a certain constraint is applied to a search space of the heavy-haul train, to define upper and lower limits for exploration of the heavy-haul train. The upper limit is a speed-displacement curve of the locomotive operating at full level, and the lower limit is a speed-time curve of operation with an initial traction force of 40% which decreases by 1% every 200 steps. A state-action that exceeds the expected explore range receives a penalty. The explore range reward function is as follows:

$$r_{k+1}^h = \begin{cases} -c_1(v_{k+1,1} - V_H^{lim}(p_{k+1,1}) + c_2)^{c_3} - c_4, & v_{k+1,1} - V_H^{lim}(p_{k+1,1}) > 0 \\ 0, & v_{k+1,1} - V_H^{lim}(p_{k+1,1}) \le 0 \end{cases} \quad (5)$$

$$r_{k+1}^l = \begin{cases} -c_5 \cdot (V_L^{lim}(k+1) - v_{k+1,1} + c_6)^{c_7} - c_8, & V_L^{lim}(k+1) - v_{k+1,1} > 0 \\ 0, & V_L^{lim}(k+1) - v_{k+1,1} \le 0 \end{cases} \quad (6)$$

$r_{k+1}^h$ is a reward function of a maximum speed at a time point k+1; $r_{k+1}^l$ is a reward function of a minimum speed at the time point k+1; $c_1$ to $c_8$ are constants; $v_{k+1,1}$ is a speed of the locomotive at the time point k+1; $V_L^{lim}(p_{k+1,1})$ is an upper speed limit at the position where the train is located at the time point k+1; $V_L^{lim}(k+1)$ is a lower speed limit at the time point k+1.

During the operation of the heavy-haul train, the coupler force should change within a maximum stress limit to avoid decoupling accidents. To avoid that the heavy-haul train constantly exerts a minimum control force, the reward function of the coupler force is processed in a piecewise manner. The reward function is a fixed value in a normal coupler force range. When the coupler force is greater than 1000, the reward of the coupler force decreases gradually. The maximum coupler force reward function $r_{Fc\ max}$ is constructed as follows.

$$r_{Fcmax} = \begin{cases} 0.5 & F_{cmax} < 1000 \\ \frac{1}{2}e^{\frac{F_{cmax}-1000}{200}} & 1000 \le F_{cmax} < 2000 \end{cases} \quad (7)$$

where $F_{c\ max}$ is a maximum cooler force of the whole train. The above reward is integrated into an experience database, and the reward is in the following form:

$$r = \theta[\ r_v \quad r_{k+1}^h \quad r_{k+1}^l \quad r_{Fcmax}\ ]^T; \quad (8)$$

where $\theta=[\theta_1\ \theta_2\ \theta_3\ \theta_4]$, and $\Sigma\theta_i=1$

To improve the training effect, all rewards are normalized.

Step 5: Memory

In the SAC reinforcement learning algorithm, it is necessary to introduce a memory to store the operation state data of the heavy-haul train to train the reinforcement learning network. Since the data inputted to the expert strategy network is in a temporal structure, the operation state data of the heavy-haul train needs to be preprocessed to meet sampling accuracy of the expert strategy network.

Step 6: Training a Reinforcement Learning Network by Using a SAC Reinforcement Learning Algorithm This embodiment adopts a soft actor-critic (SAC) algorithm architecture in reinforcement learning. This algorithm is an offline strategy algorithm developed for maximum entropy reinforcement learning. Different from the common reinforcement learning algorithm based on a deterministic strategy, the SAC reinforcement learning algorithm generates a random strategy, so that the exploration of the state space achieves better performance. The architecture of the SAC reinforcement learning algorithm consists of one actor network and two critic networks. Compared with the structure using one critic network, the structure using two critic networks can effectively reduce network overestimation and make the training curve smoother. The input of the actor network is a current state, and the output of the actor network is an action and a variance of an action distribution. The output of the critic network is a value of an action in the current state, which is used as an update basis of the actor network. The SAC reinforcement learning algorithm combines the advantages of both online and offline strategies, and a memory is introduced. The reinforcement learning network can extract samples from the memory for training, to improve the utilization of data and break the correlation of continuous samples, thereby facilitating training of the reinforcement learning network.

Figure 3:
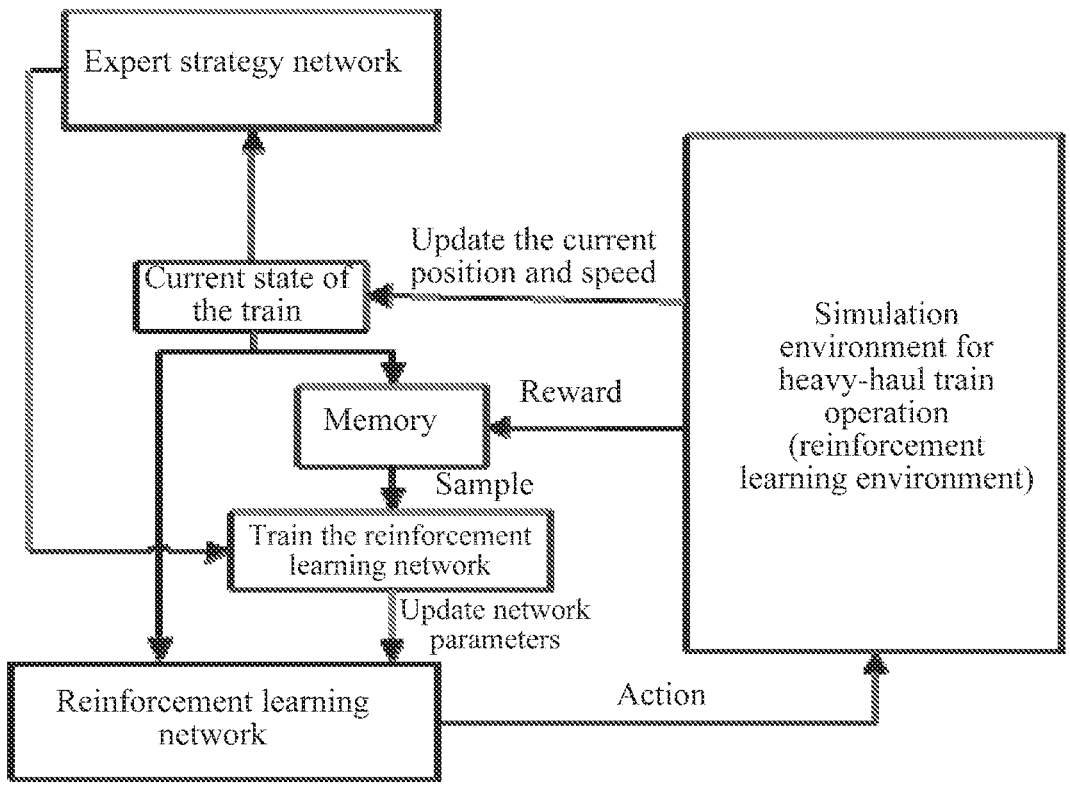
FIG. 3 is a structural block diagram of training a heavy-haul train virtual controller according to Embodiment 3 of the present disclosure.

The structural block diagram of this embodiment is shown in FIG. 3, including an expert strategy network, a reinforcement learning network, a memory, and a simulation environment for heavy-haul train operation. In the training phase, the reinforcement learning network provides, under current network parameters, a generated action to the simulation environment for heavy-haul train operation according to the operation state data of the heavy-haul train. The simulation environment for heavy-haul train operation updates the operation state of the heavy-haul train according to the current action, and gives a reward to the current action. The operation stale of the heavy-haul train and the reward are stored in the memory and constrained by the expert strategy network, waiting to be sampled and learned by the reinforcement learning network.

An optimal strategy expression of the SAC algorithm is expressed by formula (9), which describes a relationship among optimal strategy, reward and entropy. The optimal strategy is divided into a reward and a regularization term of entropy. In the initial period of training, the strategy is random and a small reward is obtained. A better strategy can be explored by increasing the entropy value. As the obtained reward increases, the entropy value should be reduced so that the good strategy can be maintained until the end of training, thereby obtaining a maximum reward and minimum entropy, and achieving a stable optimal strategy.

$$\pi^* = \operatorname{argmax}_\pi \sum_t E_{(s_t,a_t)\sim\rho_\pi}[r(s_t, a_t) + \alpha H(\pi(\cdot|s_t))] \quad (9)$$

In the formula, $r(s_t, a_t)$ is a reward for taking an action under the current operation state of the heavy-haul train; $H(\pi(\cdot|s_t))=E_{a\sim\pi(\cdot|s_t)}[-\log(\pi(a|s))]$ represents an entropy value of an action, and the coefficient $\alpha$ in front of the entropy value is a temperature coefficient, which controls the randomness of the action. A larger temperature coefficient $\alpha$ indicates higher randomness of the action, which is more conducive to the exploration of the operation state space of heavy-haul train. The combination of state and action at each time point forms a trajectory, and a maximum expectation calculated from this trajectory is the optimal strategy expected. The temperature coefficient $\alpha$ changes with the training process. Formula (17) is used to automatically adjust this parameter; $\alpha$ is also used in the expression of the value function, and serves as a regularization term in combination with the entropy.

The regularization of the entropy of the SAC algorithm is not only embodied in the strategy, but also embodied in the state-action value function $Q(s_t, a_t)$. The calculation formula is formula (10):

$$T^\pi Q(s_t,a_t) \Box r(s_t,a_t) + \gamma E_{s_{t+1}\sim p}[V(s_{t+1})] \quad (10);$$

$$V(s_t)=E_{a_t\sim\pi}[Q(s_t,a_t)-\alpha \log \pi(a_t|s_t)] \quad (11).$$

$T^\pi$ is a Bellman operator, which guarantees the convergence of the algorithm; the Bellman equation is an instant reward $r(s_t, a_t)$ of an action at a current time point plus a discount value expectation of an action at a next time point. The state value $V(s_t)$ is calculated by subtracting the Q value of the action from the current operation state, and then adding the entropy term $\alpha H(\pi(\cdot|s_t))$; $\gamma$ is a discount factor to ensure the convergence of the value function; $E_{s_{t+1}\sim p}(.)$ is a state value expectation at the next time point under a state transition probability p.

The loss of the critic network is given by formula (12), which is a loss in a form of a temporal differential error (TD error).

$$J_Q(\theta) = E_{(s_t,a_t)\sim D}\left[\frac{1}{2}\left(Q_\theta(s_t, a_t) - (r(s_t, a_t) + \gamma E_{s_{t+1}\sim p}[V_{\bar\theta}(s_{t+1})])\right)^2\right]; \quad (12)$$

$V_{\bar\theta}(s_{t+1})$ is a Q value outputted by a target critic network minus the entropy value, as shown in formula (11); the target critic network has the same structure as the critic network, except that the parameter update lags behind the critic network. There are two critic networks $Q_{\theta 1}$ and $Q_{\theta 2}$ in the SAC reinforcement learning algorithm. The minimum Q value is selected as $Q_\theta(s_t,a_t)$ during training to reduce overestimation.

In this embodiment, the actor network is trained by using two loss functions: in one loss function, the actor network is trained by using the value outputted by the critic network, to expect the value of the action to be maximized; in the other loss function, training is performed by using a mean square error loss between the action outputted by the expert strategy network in the same environment and the action outputted by the actor network, so as to obtain a decision similar to that of the expert strategy network through training.

The value loss of the output of the critic network with respect to the actor network is given by formula (13):

$$J_{ori}(\phi)=E_{s_t\sim D, \dot{o}_t\sim N}[\alpha \log \pi_\phi(f_\phi(\dot{o}_t;s_t)|s_t)-Q_\theta(s_t,f_\phi(\dot{o}_t;s_t))] \quad (13).$$

$\pi_\phi$ is implicitly defined according to $f_\phi$; $f_\phi(\dot{o}_t;s_t)$ is a re-parameterized action, which helps the network to pass the error backward; $\dot{o}_t$ is noise sampled from a fixed distribution (such as a spherical Gaussian distribution).

The supervised loss function of expert strategy to the reinforcement learning actor network output is given by formula (14).

$$J_{sup}(\theta^\mu) = E_{s_t\Box D, a_t\sim\pi}\left[\frac{1}{2}\|f_\phi(\dot{o}_t;s_t) - \mu(s_t)\|^2\right]; \quad (14)$$

$\mu(s_t)$ is an action outputted by the expert network in a current state $s_t$; $f_\phi(\dot{o}_t;s_t)$ is an action outputted by the actor network in the state $s_t$, and a root mean square error of the two actions is calculated as a supervision loss of the expert; D and $\pi$ are a state space and an action space.

A comprehensive loss of the actor network is obtained by adding a loss $J_{ori}$ of the output of the critic network with respect to the actor network and a loss $J_{sup}$ of the output of the expert network with respect to the output of the actor network multiplied by a proportional coefficient $\lambda$, as shown in formula (15):

$$J=J_{ori}+\lambda \cdot J_{sup} \quad (15)$$

The temperature parameter determines the value of the entropy. During the training process, it is necessary to automatically adjust the temperature parameter so that the model can be trained stably. Therefore, the temperature parameter is taken as a constraint object, and the training process is considered as an optimization problem: keeping the entropy of the strategy greater than a threshold while maximizing the expected return. The expression to be optimized is shown in formula (16).

$$\max_{\pi_{0:T}} E_{\rho_\pi}\left[\sum_{t=0}^T r(s_t, a_t)\right], \quad (16)$$

$$\text{s.t. } E_{(s_t,a_t)\sim\rho_\pi}[-\log\pi_t(a_t|s_t)] \geq \overline{H}; \forall t;$$

$\Sigma_{t=0}^T r(s_t,a_t)$ is a cumulative reward from time point 0 to time point T, and a maximum expectation $E_{\rho_\pi}(.)$ thereof is solved; $\rho_\pi$ represents a mapping from state to action; $E_{(s_t,a_t)\sim\rho_\pi}[-\log \pi_t(a_t|s_t)]$ is the expectation of entropy; $\overline{H}$ is a minimum expected entropy, which is used as a constraint for the maximum expectation of the reward $\Sigma_{t=0}^T r(s_t,a_t)$ of the entire trajectory from time point 0 to time point T.

According to formula (16), the loss function (17) that needs to be optimized is finally obtained:

$$J(\alpha)=E_{s_t\sim D}[E_{a\sim\pi_\phi(\cdot|s_t)}[-\alpha \log \pi_t(a|s_t)-\alpha\overline{H}]] \quad (17)$$

Figure 4:
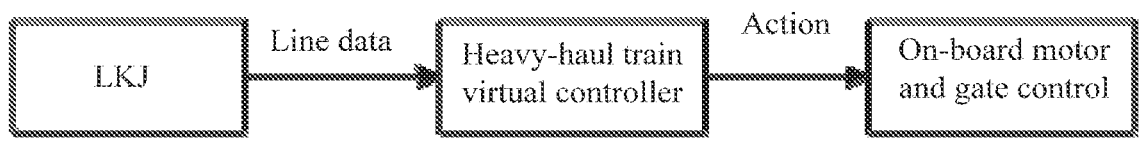
FIG. 4 is a diagram of an actual operation process of a heavy-haul train according to Embodiment 3 of the present disclosure.

The specific implementation of this embodiment is shown in FIG. 4. After a trained reinforcement learning controller is obtained, current line information and vehicle state information (current position, speed, and so on) are read from LKJ equipment of the train. The read information is inputted to the heavy-haul train virtual controller, and the heavy-haul train virtual controller outputs an action to a central control unit of the train to complete one cycle of control.

To obtain a robust prediction model, it is necessary to add Gaussian noise to the expert strategy data (that is, the historical data of actual operation of the heavy-haul train).

In the selection of line sections, part of the line is intercepted for training in accordance with normal start-stop sections of Datong-Qinhuangdao Line. For the traction startup condition, the section of 30-50 km is selected for training, and the initial speed of the train is 0 km/h; for the cruise condition, the section of 80-100 km is selected for training, and the initial speed of the train is 70 km/h; for the braking condition, the section of 545-550 km is selected for training, and the initial speed of the train is 70 km/h.

Figure 5:
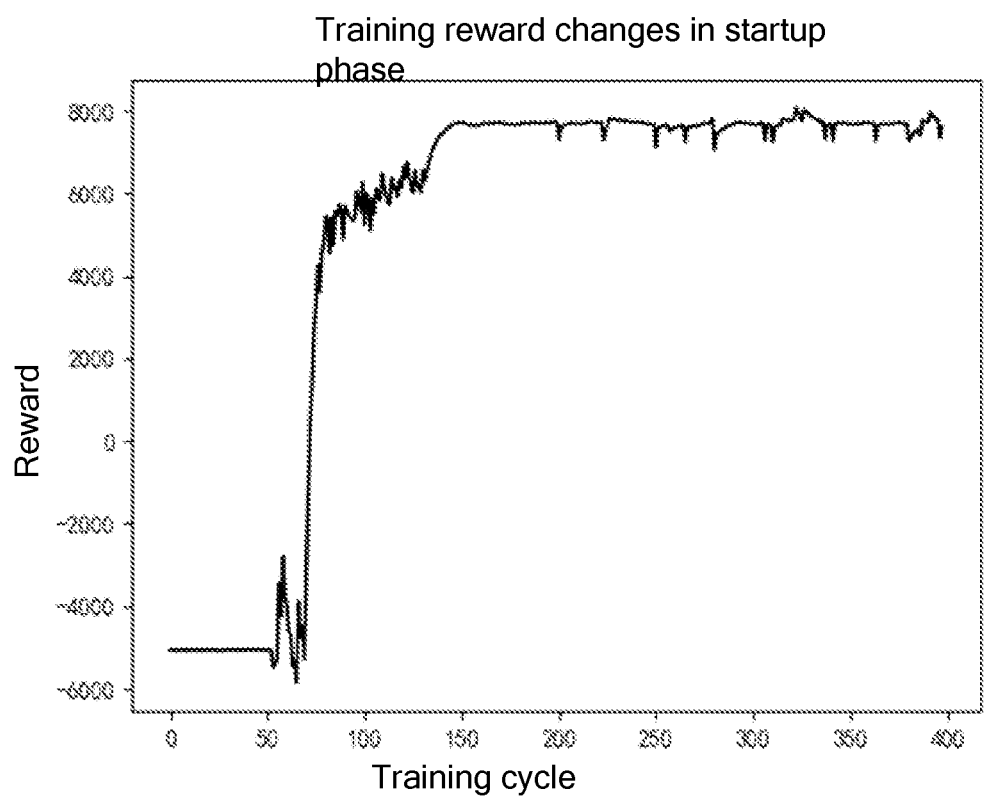
FIG. 5 shows a change curve of a training reward in a startup phase according to Embodiment 3 of the present disclosure.
Figure 6:
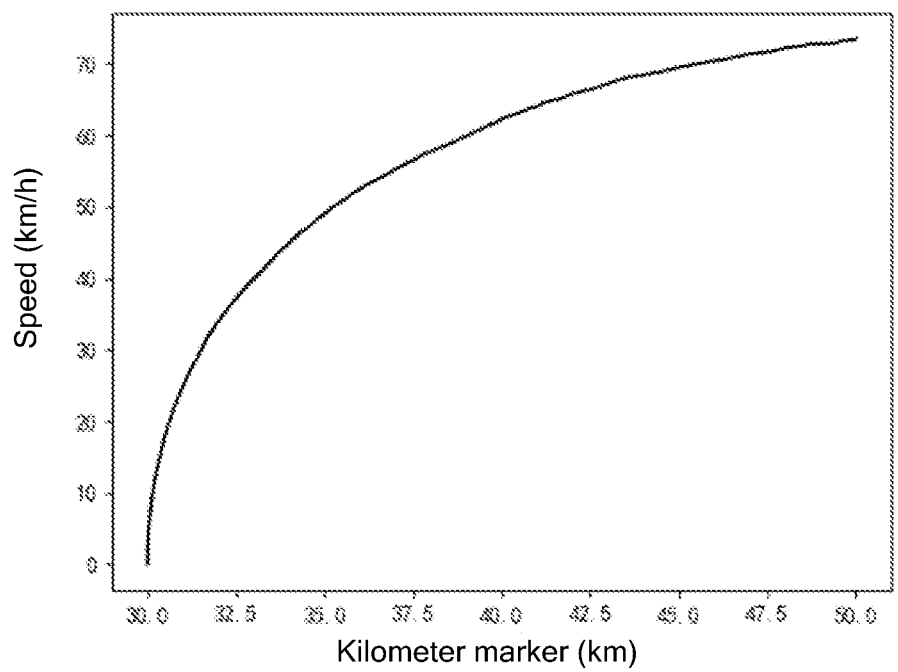
FIG. 6 shows a speed-displacement curve in a startup process according to Embodiment 3 of the present disclosure.
Figure 7:
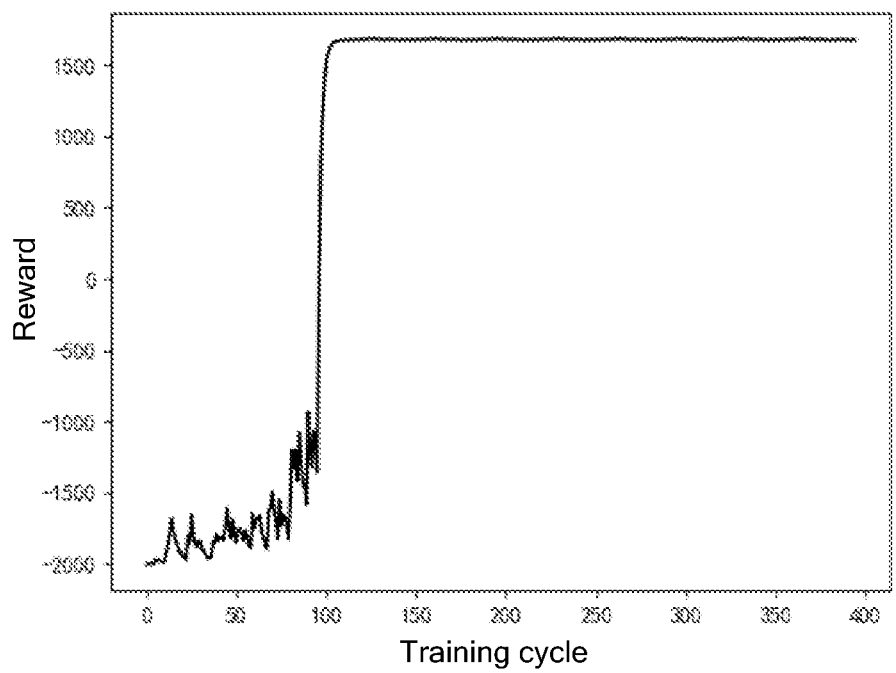
FIG. 7 shows a change curve of a training reward in a braking phase according to Embodiment 3 of the present disclosure.
Figure 8:
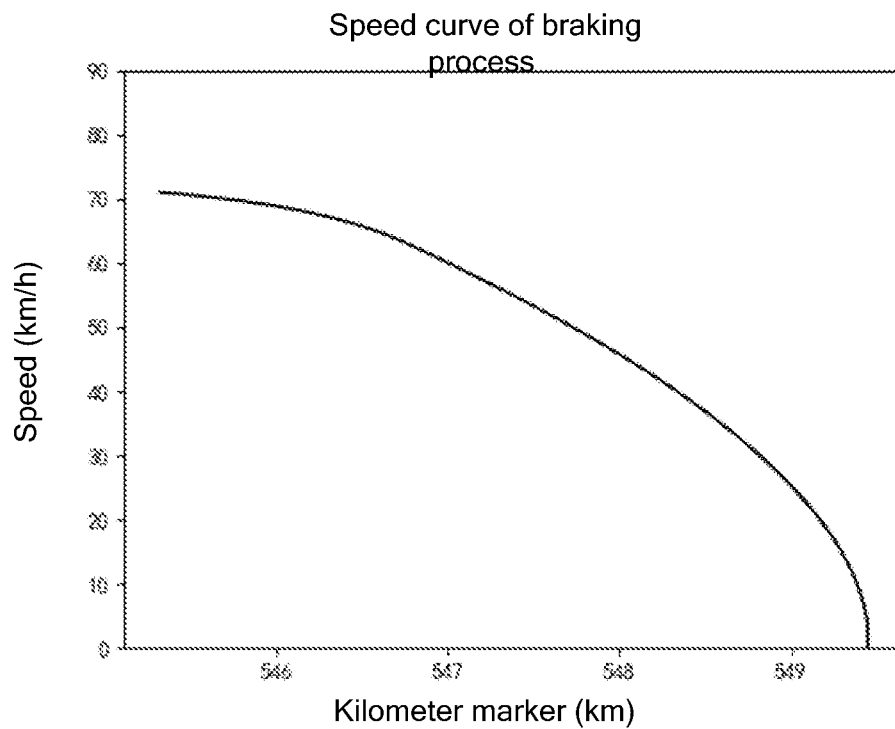
FIG. 8 shows a speed-displacement curve in a parking braking process according to Embodiment 3 of the present disclosure.
Figure 9:
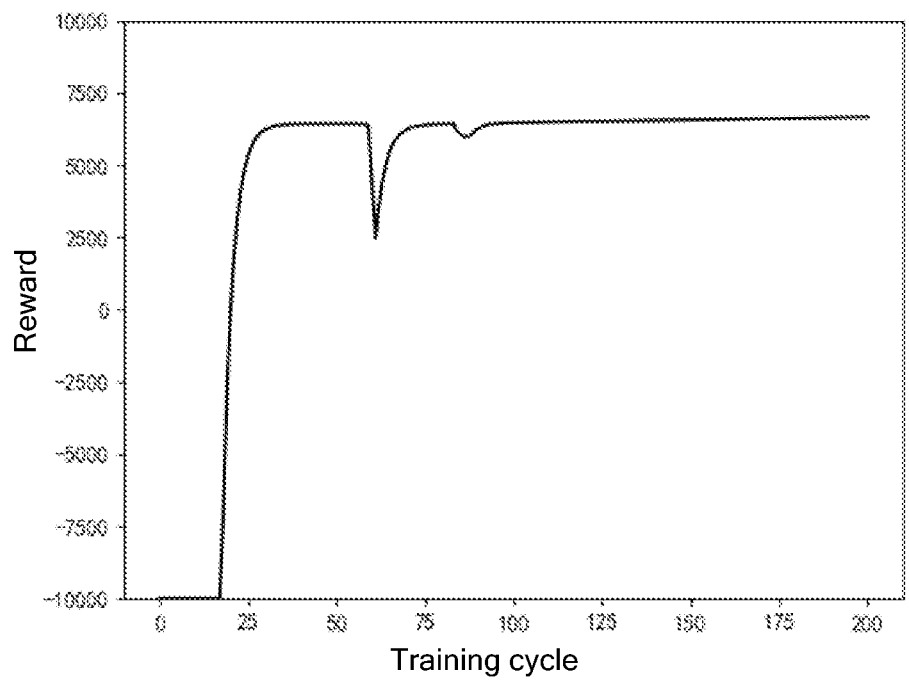
FIG. 9 shows a change curve of a training reward in a cruise phase according to Embodiment 3 of the present disclosure.
Figure 10:
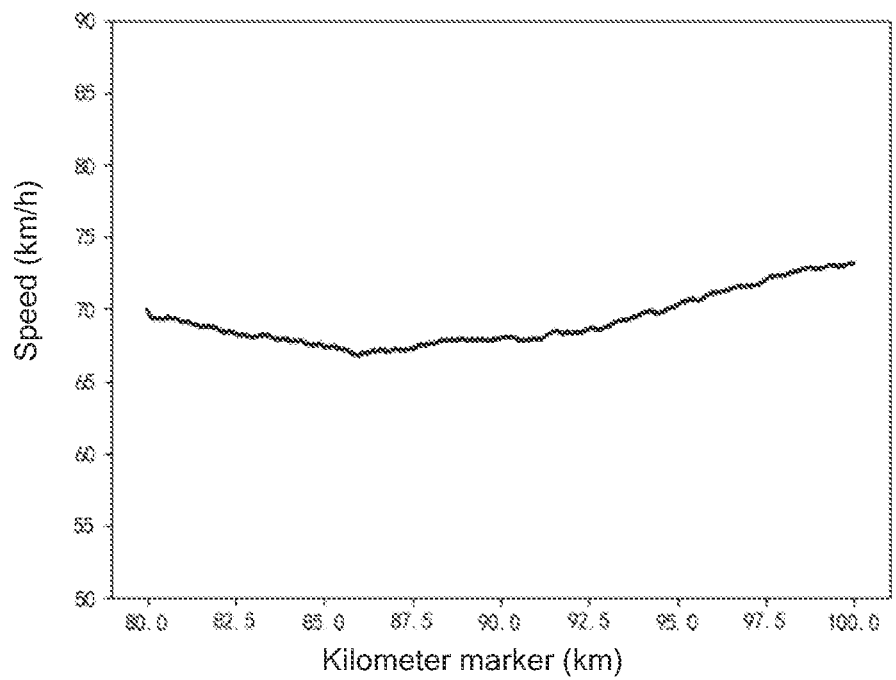
FIG. 10 shows a speed-displacement curve in a cruise process according to Embodiment 3 of the present disclosure.

FIG. 5 shows a learning curve of the heavy-haul train in iterative training in the startup traction phase. A higher reward obtained from the environment indicates better control of the heavy-haul train under the set goal. It can be seen from FIG. 5 that the SAC algorithm combined with expert strategy can achieve a stable and higher total environmental reward in the later period of training. In FIG. 6, the speed of the train in the startup phase is within an expected state space interval, and the speed curve of the heavy-haul train during the startup traction phase is relatively stable. In terms of parking braking, in FIG. 7, the heavy-haul train has obtained a good parking braking solution through exploration; in FIG. 8, the speed curve of the heavy-haul train is smoother and more stable in the early period, and the speed decreases faster due to the increase in the braking force in the middle and late periods, which is in line with expert strategy control. In terms of cruise control, in FIG. 9, the heavy-haul train trained by using the SAC algorithm combined with expert strategy also receives stable and high rewards in the later period of training; in FIG. 10, according to the SAC algorithm combined with the expert strategy, there is a transition zone when the train enters the cruise control, where the speed changes slowly; in the later period of the cruise, the speed increases and is below the speed limit for safe operation, which meets the requirement for efficiency of train operation.

Figure 11:
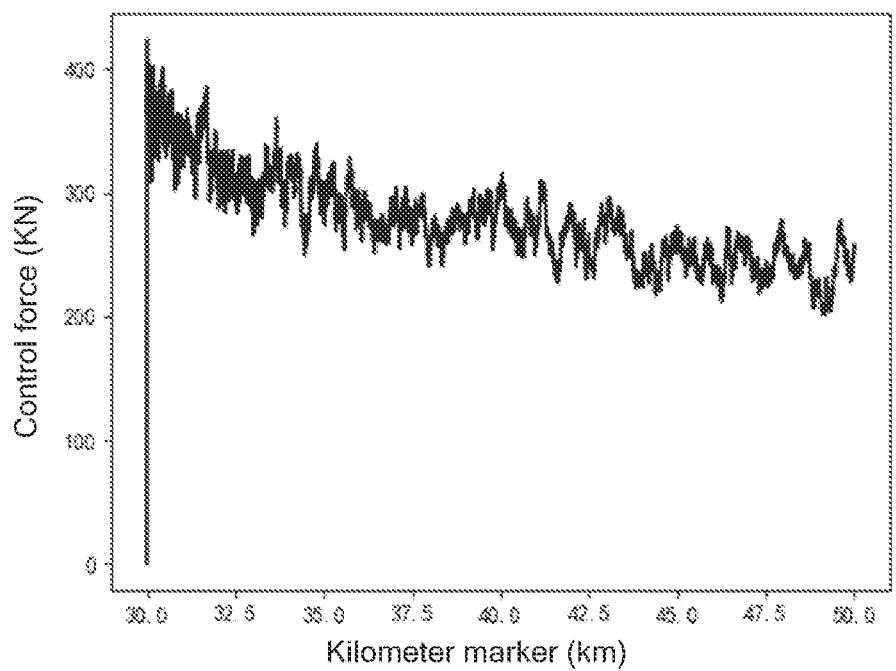
FIG. 11 shows a control force curve in a startup phase according to Embodiment 3 of the present disclosure.
Figure 12:
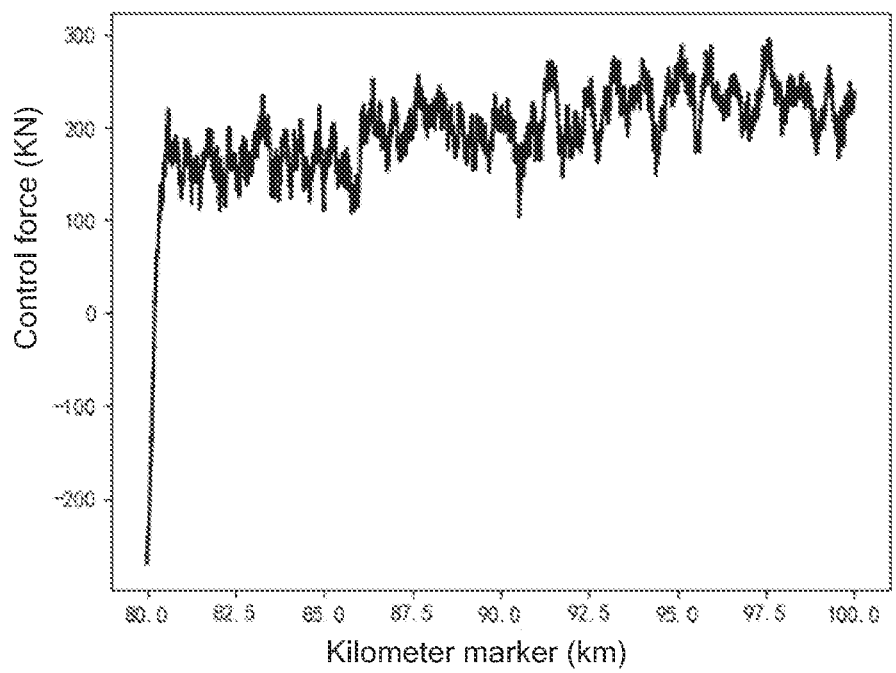
FIG. 12 shows a control force curve in a cruise phase according to Embodiment 3 of the present disclosure.
Figure 13:
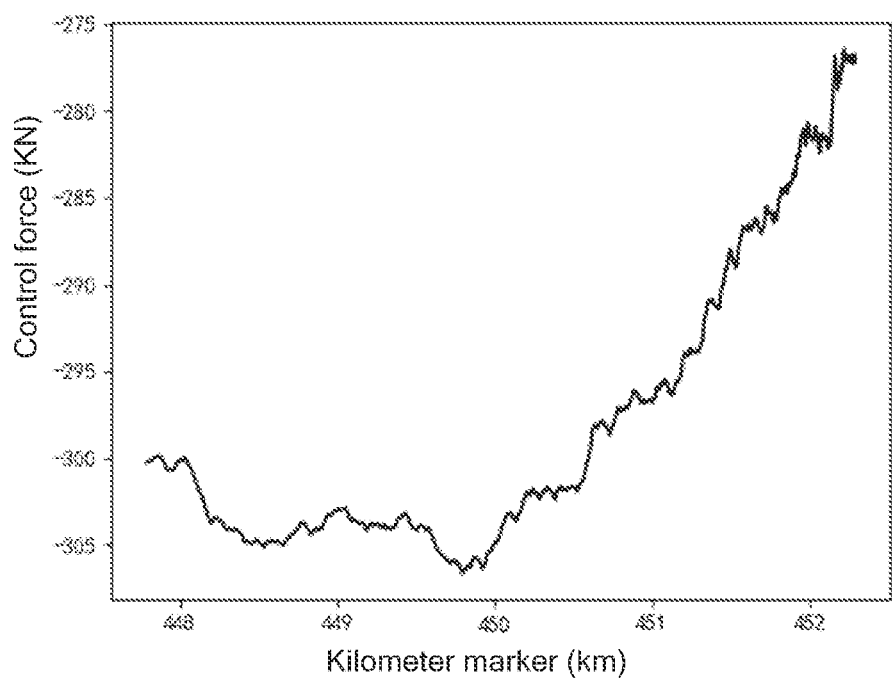
FIG. 13 shows a control force curve in a braking phase according to Embodiment 3 of the present disclosure.

FIG. 11 to FIG. 13 show change curves of the control force in three working conditions: startup traction, cruise control, and braking control. Under the three working conditions, the train basically maintains a traction/braking state. Under the cruise condition, the control force can be adjusted to cope with changing line conditions. In addition, the switching between the traction and braking conditions is relatively smooth and does not cause excessive longitudinal impulse, which satisfies the traction/braking force characteristics of the HXD1 locomotive and the safety and stability control indicators of the train.

Each embodiment of the present specification is described in a progressive manner, each embodiment focuses on the difference from other embodiments, and for the same and similar parts between the embodiments, reference may be made to each other. For the system disclosed in the embodiments, since the system corresponds to the method disclosed in the embodiments, the description is relatively simple, and reference can be made to the method description.

In this specification, several specific embodiments are used for illustration of the principles and implementations of the present disclosure. The description of the foregoing embodiments is used to help illustrate the method of the present disclosure and the core ideas thereof. In addition, those of ordinary skill in the art can make various modifications in terms of specific implementations and scope of application in accordance with the ideas of the present disclosure. In conclusion, the content of the present specification shall not be construed as a limitation to the present disclosure.

What is claimed is:

1. A method for controlling a heavy-haul train based on reinforcement learning, comprising:

obtaining operation state information of a heavy-haul train at a current time point, wherein the heavy-haul train comprises a plurality of vehicles, the vehicles comprise a traction locomotive and freight wagons, and the operation state information comprises a speed of the heavy-haul train and a position of the heavy-haul train; and obtaining a heavy-haul train action of a next time point according to the operation state information of the heavy-haul train at the current time point and a heavy-haul train virtual controller, and sending the heavy-haul train action of the next time point to a heavy-haul train control unit to control operation of the heavy-haul train;

wherein the heavy-haul train virtual controller stores line information of the heavy-haul train;

a training process of the heavy-haul train virtual controller comprises: constructing a training architecture of the heavy-haul train virtual controller, wherein the training architecture of the heavy-haul train virtual controller comprises the expert strategy network, the reinforcement learning network, a memory, and a simulation environment for heavy-haul train operation, and the memory stores the operation state data of the heavy-haul train; inputting same-cycle positions in the operation state data of the heavy-haul train to the expert strategy network and the actor network of the reinforcement learning network, and inputting same-cycle speeds in the operation state data of the heavy-haul train to the expert strategy network and the actor network of the reinforcement learning network, to obtain an expert action and a reinforcement learning action; inputting the reinforcement learning action as well as the same-cycle speeds and the same-cycle positions in the operation state data of the heavy-haul train to the critic networks of the reinforcement learning network, to obtain a critic loss; calculating an instruction loss according to the expert action and the reinforcement learning action; and updating actor network parameters of the reinforcement learning network according to a comprehensive loss, until a required heavy-haul train virtual controller is obtained, wherein the comprehensive loss is a sum of the critic loss and the instruction loss; and the reinforcement learning network comprises one actor network and two critic networks; the reinforcement learning network is constructed according to a soft actor-critic (SAC) reinforcement learning algorithm; the operation state data of the heavy-haul train is a temporal sequence of positions, speeds, and rewards of the heavy-haul train in M cycles.

2. The method for controlling a heavy-haul train based on reinforcement learning according to claim 1, wherein a training process of the expert strategy network comprises:

pre-training a recurrent neural network by using historical data of actual operation of the heavy-haul train, to obtain the expert strategy network, wherein the historical data of actual operation of the heavy-haul train is a temporal sequence of positions, speeds, and control forces of the heavy-haul train on a line in N cycles.

3. The method for controlling a heavy-haul train based on reinforcement learning according to claim 1, wherein the training process of the heavy-haul train virtual controller further comprises:
updating critic network parameters of the reinforcement learning network according to a reward of the operation state data of the heavy-haul train.

4. The method for controlling a heavy-haul train based on reinforcement learning according to claim 1, wherein the training process of the heavy-haul train virtual controller further comprises:
inputting the reinforcement learning action to the simulation environment for heavy-haul train operation, to obtain updated operation state data of the heavy-haul train, and storing the updated operation state data of the heavy-haul train into the memory.

5. The method for controlling a heavy-haul train based on reinforcement learning according to claim 1, wherein a process of constructing the simulation environment for heavy-haul train operation comprises:
determining a kinematic model of the heavy-haul train;
determining, in a reinforcement learning environment, a reward function of an operation process of the heavy-haul train, wherein the reward function comprises a speed reward function, an explore range reward function, and a maximum coupler force reward function; and
forming the simulation environment for heavy-haul train operation according to the kinematic model of the heavy-haul train and the reward function.

6. The method for controlling a heavy-haul train based on reinforcement learning according to claim 5, wherein the determining a kinematic model of the heavy-haul train comprises:
modeling the operation process of the heavy-haul train by using a multi-particle longitudinal dynamic equation of the heavy-haul train, to obtain the kinematic model of the heavy-haul train.

7. A system for controlling a heavy-haul train based on reinforcement learning, comprising:
an information obtaining module, configured to obtain operation state information of a heavy-haul train at a current time point, wherein the heavy-haul train comprises a plurality of vehicles, the vehicles comprise a traction locomotive and freight wagons, and the operation state information comprises a speed of the heavy-haul train and a position of the heavy-haul train; and
an action determining module, configured to obtain a heavy-haul train action of a next time point according to the operation state information of the heavy-haul train at the current time point and a heavy-haul train virtual controller, and send the heavy-haul train action of the next time point to a heavy-haul train control unit to control operation of the heavy-haul train;
wherein the heavy-haul train virtual controller stores line information of the heavy-haul train;
a training process of the heavy-haul train virtual controller comprises: constructing a training architecture of the heavy-haul train virtual controller, wherein the training architecture of the heavy-haul train virtual controller comprises the expert strategy network, the reinforcement learning network, a memory, and a simulation environment for heavy-haul train operation, and the memory stores the operation state data of the heavy-haul train; inputting same-cycle positions in the operation state data of the heavy-haul train to the expert strategy network and the actor network of the reinforcement learning network, and inputting same-cycle speeds in the operation state data of the heavy-haul train to the expert strategy network and the actor network of the reinforcement learning network, to obtain an expert action and a reinforcement learning action; inputting the reinforcement learning action as well as the same-cycle speeds and the same-cycle positions in the operation state data of the heavy-haul train to the critic networks of the reinforcement learning network, to obtain a critic loss; calculating an instruction loss according to the expert action and the reinforcement learning action; and updating actor network parameters of the reinforcement learning network according to a comprehensive loss, until a required heavy-haul train virtual controller is obtained, wherein the comprehensive loss is a sum of the critic loss and the instruction loss; and
the reinforcement learning network comprises one actor network and two critic networks; the reinforcement learning network is constructed according to a soft actor-critic (SAC) reinforcement learning algorithm; the operation state data of the heavy-haul train is a temporal sequence of positions, speeds, and rewards of the heavy-haul train in M cycles.

8. The system for controlling a heavy-haul train based on reinforcement learning according to claim 7, wherein a training process of the expert strategy network in the action determining module comprises:
pre-training a recurrent neural network by using historical data of actual operation of the heavy-haul train, to obtain the expert strategy network, wherein the historical data of actual operation of the heavy-haul train is a temporal sequence of positions, speeds, and control forces of the heavy-haul train on a line in N cycles.

* * * * *